(12) United States Patent
Kim et al.

(10) Patent No.: US 12,104,860 B2
(45) Date of Patent: Oct. 1, 2024

(54) ONCE-THROUGH HEAT EXCHANGER AND HEAT RECOVERY STEAM GENERATOR INCLUDING THE SAME

(71) Applicant: DOOSAN ENERBILITY CO., LTD., Changwon (KR)

(72) Inventors: Jae Cheol Kim, Busan (KR); Hoon Jegal, Changwon (KR); Jong Ho Hong, Changwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 18/457,967

(22) Filed: Aug. 29, 2023

(65) Prior Publication Data
US 2024/0159470 A1   May 16, 2024

(30) Foreign Application Priority Data
Nov. 14, 2022   (KR) .................. 10-2022-0151967

(51) Int. Cl.
| | |
|---|---|
| *F22B 1/18* | (2006.01) |
| *F01K 23/08* | (2006.01) |
| *F02C 6/18* | (2006.01) |
| *F22B 37/14* | (2006.01) |
| *F22B 37/74* | (2006.01) |

(Continued)

(52) U.S. Cl.
CPC ............ *F28D 7/16* (2013.01); *F01K 23/08* (2013.01); *F02C 6/18* (2013.01); *F22B 1/1815* (2013.01); *F22B 37/14* (2013.01); *F22B 37/74* (2013.01); *F28F 9/0275* (2013.01); *F05D 2220/31* (2013.01); *F05D 2220/32* (2013.01); *F05D 2220/72* (2013.01); *F05D 2220/74* (2013.01); *F05D 2260/213* (2013.01)

(58) Field of Classification Search
CPC ...... F22B 1/1815; F22B 37/14; F22B 37/141; F22B 37/142; F22B 37/70; F22B 37/74; F22G 3/007; F22G 3/009; F28F 9/0275
See application file for complete search history.

(56) References Cited

U.S. PATENT DOCUMENTS

| | | | |
|---|---|---|---|
| 4,832,119 A | 5/1989 | Bloor | |
| 6,957,630 B1 * | 10/2005 | Mastronarde | ........... F22B 37/14 |
| | | | 122/451 S |

(Continued)

FOREIGN PATENT DOCUMENTS

| | | | |
|---|---|---|---|
| FR | 1202747 A | * | 1/1960 |
| JP | 58-010592 U | | 1/1983 |

(Continued)

OTHER PUBLICATIONS

KR OA dated Aug. 6, 2024.

*Primary Examiner* — Eric S Ruppert
(74) *Attorney, Agent, or Firm* — Harvest IP Law, LLP (57) ABSTRACT

Disclosed herein is a once-through heat exchanger that includes a tube stack including a plurality of tubes, a plurality of heads connected to the tubes and configured to accommodate heated steam, and a manifold connected to the heads via a first link pipe and a second link pipe and configured to accommodate heated steam. The heads are spaced in a direction crossing a longitudinal direction thereof, and the first link pipe and the second link pipe include a first inclined link part or a second inclined link part, respectively, extending at an angle to each other.

17 Claims, 6 Drawing Sheets

(51) Int. Cl.
*F28D 7/16* (2006.01)
*F28F 9/02* (2006.01)

(56) References Cited

U.S. PATENT DOCUMENTS

| | | | | |
|---|---|---|---|---|
| 2009/0173072 A1* | 7/2009 | Mastronarde | ......... | F28F 9/0275 |
| | | | | 60/659 |
| 2010/0313828 A1 | 12/2010 | Moore | | |
| 2011/0162594 A1 | 7/2011 | Franke | | |
| 2011/0239961 A1 | 10/2011 | Bauver | | |
| 2011/0265735 A1* | 11/2011 | Suganuma | .............. | F22B 37/74 |
| | | | | 122/235.15 |
| 2016/0102917 A1 | 4/2016 | Badin | | |
| 2016/0369640 A1* | 12/2016 | AlJwesm | ................ | F01D 25/30 |
| 2019/0024988 A1* | 1/2019 | Wilson | ................ | F28F 9/0214 |
| 2019/0170019 A1* | 6/2019 | Magee | ................ | F22B 37/225 |

FOREIGN PATENT DOCUMENTS

| | | | | | |
|---|---|---|---|---|---|
| JP | S5810592 U | * | 1/1983 | ............. | F22B 37/22 |
| JP | H08303704 A | | 11/1996 | | |
| JP | 2007016791 A | | 1/2007 | | |
| JP | 2009222304 A | | 10/2009 | | |
| JP | 2018028320 A | | 2/2018 | | |
| KR | 1999-0016558 U | | 5/1999 | | |
| KR | 2001-0012356 A | | 2/2001 | | |
| KR | 10-2010-0105759 A | | 9/2010 | | |
| KR | 2010105759 A | * | 9/2010 | .......... | F28D 7/1623 |
| KR | 10-1005066 B1 | | 12/2010 | | |
| KR | 10-2014-0091465 A | | 7/2014 | | |
| KR | 10-2018-0030095 A | | 3/2018 | | |
| KR | 10-1928374 B1 | | 2/2019 | | |
| KR | 10-2266676 B1 | | 6/2021 | | |

\* cited by examiner

ONCE-THROUGH HEAT EXCHANGER AND HEAT RECOVERY STEAM GENERATOR INCLUDING THE SAME

CROSS-REFERENCE TO RELATED APPLICATION

This application claims priority to Korean Patent Application No. 10-2022-0151967, filed on Nov. 14, 2022 the disclosure of which is incorporated herein by reference in its entirety.

BACKGROUND

Technical Field

The present disclosure relates to a once-through heat exchanger and a heat recovery steam generator including the same.

Related Art

A gas turbine is a power engine that mixes air compressed by a compressor with fuel for combustion and rotates a turbine with hot gas produced by the combustion. The gas turbine is used to drive a generator, an aircraft, a ship, a train, etc.

A heat recovery steam generator (HRSG) is an energy recovery device that recovers heat from a hot gas stream to produce steam that is usable to drive a steam turbine (combined cycle). The HRSG typically includes four main components: an economizer, an evaporator, a superheater and a preheater.

In particular, a natural circulation HRSG includes piping to facilitate a proper rate of circulation within an evaporator tube, as well as evaporator heating surfaces and drums. A once-through HRSG includes a once-through evaporator that replaces a natural circulation component, thereby providing higher facility efficiency on site and further assisting in extending HRSG life in the absence of thick wall drums.

In the case of supercritical pressure vertical once-through HRSGs, it is difficult to ensure structural stability due to severe thermal expansion of an outlet head of a final superheater. Heating and thermal expansion of the outlet head by steam heated to a high temperature distorts tube arrangement and concentrates thermal stress, resulting in a high risk of breakage.

SUMMARY

Aspects of one or more exemplary embodiments provide a once-through heat exchanger, a heat recovery steam generator, and a combined power generation system including the same, which are capable of minimizing damage caused by thermal expansion.

Additional aspects will be set forth in part in the description which follows and, in part, will become apparent from the description, or may be learned by practice of the exemplary embodiments.

According to an aspect of an exemplary embodiment, there is provided a once-through heat exchanger that includes a tube stack including a plurality of tubes, a plurality of heads connected to the tubes and configured to accommodate heated steam, and a manifold connected to the heads via a first link pipe and a second link pipe and configured to accommodate heated steam, and the first link pipe or the second link pipe includes a diameter varying portion whose inner diameter gradually changes.

The heads may be spaced in a direction perpendicular to a longitudinal direction thereof, and the first link pipe and the second link pipe may include a first inclined link part or a second inclined link part, respectively, extending from the manifold at an angle to each other.

The heads may be arranged parallel to each other and positioned at the same distance from the manifold.

The heads may be spaced in a height direction of the once-through heat exchanger.

The first link pipe may include a first connection link part extending from an associated one of the heads toward the manifold and the first inclined link part extending and protruding obliquely from the first connection link part and coupled to the manifold.

The second link pipe may include a second connection link part extending from an associated one of the heads toward the manifold and a second inclined link part extending and protruding obliquely from the second connection link part and coupled to the manifold.

The first connection link part and the second connection link part may be arranged parallel to each other, the first inclined link part may extend obliquely downward from the manifold, and the second inclined link part may extend obliquely upward from the manifold.

The first inclined link part may include a large diameter portion having a larger outer diameter than the first connection link part, a small diameter portion having the same inner diameter as the first connection link part, and the diameter varying portion configured to connect the large diameter portion and the small diameter portion.

The large diameter portion may be connected to the manifold, and the inner diameter of the diameter varying portion may gradually decrease from the large diameter portion to the small diameter portion.

The second inclined link part may include a large diameter portion having a larger outer diameter than the second connection link part, a small diameter portion having the same inner diameter as the second connection link part, and the diameter varying portion configured to connect the large diameter portion and the small diameter portion.

According to an aspect of another exemplary embodiment, there is provided a combined power generation system that includes a gas turbine configured to generate rotational force by combusting fuel and discharge a combustion gas, a heat recovery steam generator configured to generate and heat steam using the combustion gas discharged from the gas turbine, and a steam turbine using the steam heated by the heat recovery steam generator. The heat recovery steam generator includes a plurality of heat exchangers. Each of the heat exchangers includes a tube stack including a plurality of tubes, a plurality of heads connected to the tubes and configured to accommodate heated steam, a manifold connected to the heads via a first link pipe and a second link pipe and configured to accommodate heated steam, and the first link pipe or the second link pipe includes a diameter varying portion whose inner diameter gradually changes.

The heads may be spaced in a direction perpendicular to a longitudinal direction thereof, and the first link pipe and the second link pipe may include a first inclined link part or a second inclined link part, respectively, extending from the manifold at an angle to each other.

The heads may be arranged parallel to each other and positioned at the same distance from the manifold.

The heads may be spaced in a height direction of the heat exchanger.

The first link pipe may include a first connection link part extending from an associated one of the heads toward the manifold and the first inclined link part extending and protruding obliquely from the first connection link part and coupled to the manifold.

The second link pipe may include a second connection link part extending from an associated one of the heads toward the manifold and a second inclined link part extending and protruding obliquely from the second connection link part and coupled to the manifold.

The first connection link part and the second connection link part may be arranged parallel to each other, the first inclined link part may extend obliquely downward from the manifold, and the second inclined link part may extend obliquely upward from the manifold.

The first inclined link part may include a large diameter portion having a larger outer diameter than the first connection link part, a small diameter portion having the same inner diameter as the first connection link part, and the diameter varying portion configured to connect the large diameter portion and the small diameter portion.

The large diameter portion may be connected to the manifold, and the inner diameter of the diameter varying portion may gradually decrease from the large diameter portion to the small diameter portion.

The second inclined link part may include a large diameter portion having a larger outer diameter than the second connection link part, a small diameter portion having the same inner diameter as the second connection link part, and the diameter varying portion configured to connect the large diameter portion and the small diameter portion.

BRIEF DESCRIPTION OF THE DRAWINGS

The above and other aspects will become more apparent from the following description of the exemplary embodiments with reference to the accompanying drawings, in which.

DETAILED DESCRIPTION

Various modifications and different embodiments will be described below in detail with reference to the accompanying drawings so that those skilled in the art can easily carry out the disclosure. It should be understood, however, that the present disclosure is not intended to be limited to the specific embodiments, but the present disclosure includes all modifications, equivalents or replacements that fall within the spirit and scope of the disclosure as defined in the following claims.

The terminology used herein is for the purpose of describing specific embodiments only and is not intended to limit the scope of the disclosure. As used herein, the singular forms "a", "an" and "the" are intended to include the plural forms as well, unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Exemplary embodiments will be described below in detail with reference to the accompanying drawings. It should be noted that like reference numerals refer to like parts throughout various drawings and exemplary embodiments. In certain embodiments, a detailed description of functions and configurations well known in the art may be omitted to avoid obscuring appreciation of the disclosure by those skilled in the art. For the same reason, some components may be exaggerated, omitted, or schematically illustrated in the accompanying drawings.

Hereinafter, a combined power generation system according to a first exemplary embodiment will be described.

Figure 1:
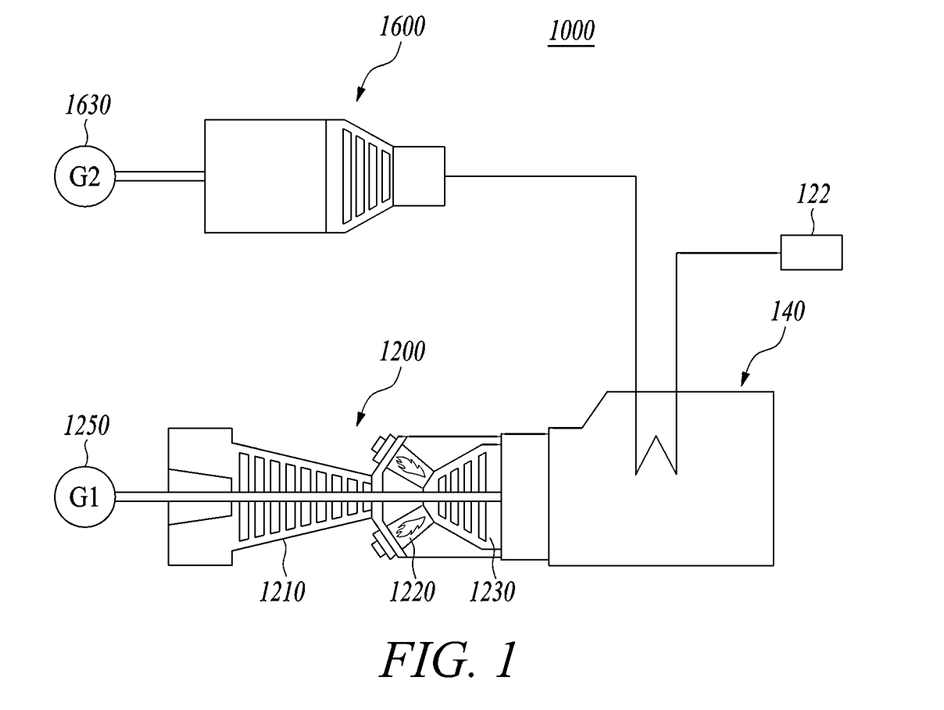
FIG. 1 is a configuration diagram illustrating a combined power generation system according to a first exemplary embodiment.
Figure 2:
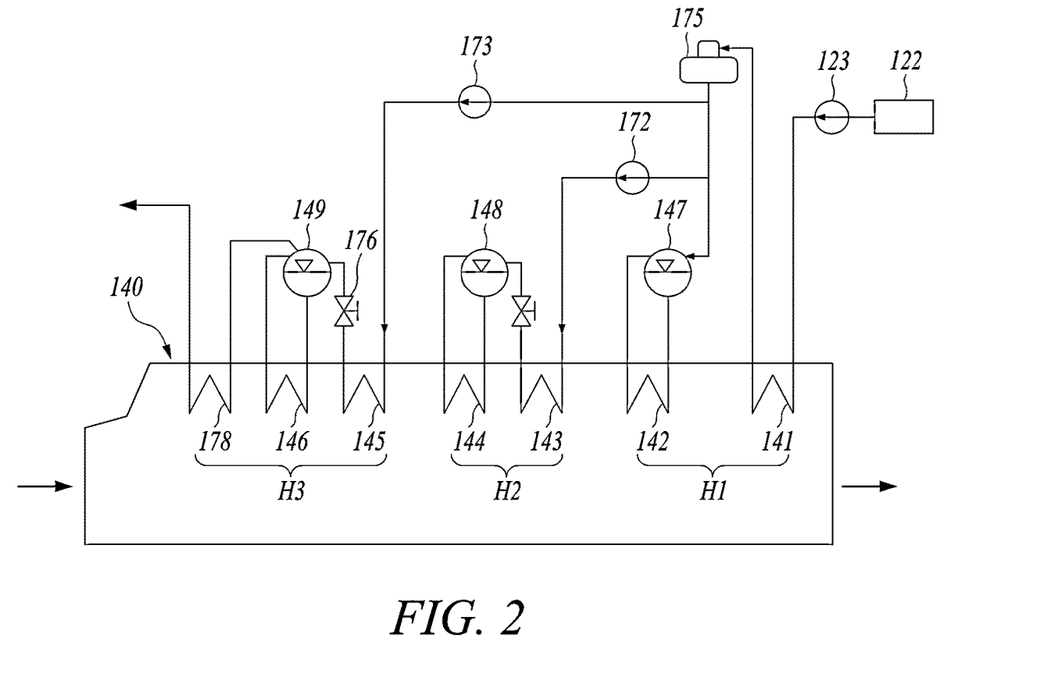
FIG. 2 is a configuration diagram illustrating a heat recovery steam generator according to the first exemplary embodiment.

FIG. 1 is a schematic configuration diagram illustrating the combined power generation system according to the first exemplary embodiment. FIG. 2 is a schematic configuration diagram illustrating a heat recovery steam generator according to the first exemplary embodiment.

Referring to FIGS. 1 and 2, the combined power generation system, which is designated by reference numeral 1000, according to the first exemplary embodiment includes a plurality of turbines to generate electric power. The combined power generation system 1000 may include a gas turbine 1200, a steam turbine 1600, a first generator G1, a second generator G2, and a heat recovery steam generator 140.

In the gas turbine 1200, in an isobaric environment, thermal energy may be released through combustion of fuel. This combustion takes place after atmospheric air is sucked and compressed to a high pressure. The hot combustion gas resulting from this process is then allowed to expand, converting its energy into kinetic energy. Finally, the exhaust gas, which still contain residual energy, is discharged to the atmosphere.

The gas turbine 1200 may include a compressor 1210, a combustor 1220, and a main turbine 1230. The compressor 1210 of the gas turbine 1200 may suck air from the outside and compress the air. The compressor 1210 may supply the combustor 1220 with the air compressed by compressor blades and may also supply cooling air to a hot region required for cooling in the gas turbine 1200.

Meanwhile, the combustor 1220 may mix the compressed air, which is supplied from the outlet of the compressor 1210, with fuel for isobaric combustion to produce combustion gas with high energy.

The high-temperature and high-pressure combustion gas produced by the combustor 1220 is supplied to the main turbine 1230. In the main turbine 1230, the combustion gas applies impingement or reaction force to a plurality of turbine blades radially disposed on the rotary shaft of the main turbine 1230 while expanding adiabatically, so that the thermal energy of the combustion gas is converted into mechanical energy for rotating the rotary shaft. Some of the mechanical energy obtained from the main turbine 1230 is used to drive the compressor 1210 to compress the air. The remaining mechanical energy is utilized as effective energy to drive the first generator G1 to generate electric power.

The heat recovery steam generator 140 produces high-temperature and high-pressure steam using the heat of the combustion gas discharged from the gas turbine 1200 and delivers the steam to the steam turbine 1600. During the process, the combustion gas is cooled. After the combustion gas flowing out of the main turbine 1230 is cooled through the heat recovery steam generator 140, it is purified and discharged to the outside.

The steam turbine 1600 rotates the blades thereof using the steam produced by the heat recovery steam generator 140 and transfers rotational energy to the second generator G2. The steam turbine 1600 supplies cooled steam back to the heat recovery steam generator 140.

The first generator G1 may be connected to the gas turbine 1200 and the second generator G2 may be connected to the steam turbine 1600 so as to generate electric power. However, the present disclosure is not limited thereto, and a single generator, instead of the first generator G1 and the second generator G2, may be connected to the gas turbine 1200 and the steam turbine 1600.

The combined power generation system may be equipped with a condenser 121 for condensing steam, a condensate reservoir 122 for storing condensed water, and a condensate pump 123 for supplying the heat recovery steam generator 140 with the condensed water stored in the condensate reservoir 122.

The steam flowing in the heat recovery steam generator 140 may have two or three levels of pressure, so that the water is pressurized to two or three or more levels of pressure. In the exemplary embodiment, the heat recovery steam generator 140 is exemplified as having three levels of pressure as shown in FIG. 2.

Referring to FIG. 2, the heat recovery steam generator 140 may include a low-pressure section H1 having a relatively low pressure, a medium-pressure section H2 having a medium pressure, and a high-pressure section H3 having a relatively high pressure. The high-pressure section H3 may be disposed adjacent to an inlet of the heat recovery steam generator 140 for introduction of combustion gas therethrough, where it gets heated by high-temperature combustion gas. The low-pressure section H1 may be disposed adjacent to an outlet of the heat recovery steam generator 140 for discharge of combustion gas therethrough, where it gets heated by low-temperature combustion gas.

The heat recovery steam generator 140 includes a condensate preheater 141, a low-pressure evaporator 142, a medium-pressure economizer 143, a medium-pressure evaporator 144, a high-pressure economizer 145, and a high-pressure evaporator 146, which are installed therein. In addition, a superheater (not shown) may be installed for each evaporator 142, 144, 146. The combustion gas flowing out of the heat recovery steam generator 140 may be discharged via a stack.

The low-pressure section H1 includes a condensate preheater 141, a low-pressure evaporator 142, and a low-pressure drum 147. The condensed water stored in the condensate reservoir 122 is delivered to the condensate preheater 141 by the condensate pump 123. The condensate preheater 141 heats the condensed water by exchanging heat with combustion gas. The water heated by the condensate preheater 141 is delivered to a deaerator 175 so that gas is removed from the condensed water.

Then, water is supplied from the deaerator 175 to the low-pressure drum 147. The low-pressure evaporator 142 may be connected to the low-pressure drum 147, so that the water stored in the low-pressure drum 147 is converted into steam by exchanging heat with combustion gas. Then, the steam is supplied to the low-pressure superheater (not shown) after steam-water separation is performed in the low-pressure drum 147.

The medium-pressure section H2 includes a medium-pressure economizer 143, a medium-pressure evaporator 144, and a medium-pressure drum 148. The water in the deaerator 175 is supplied to the medium-pressure economizer 143 by a medium-pressure pump 172. The medium-pressure economizer 143 heats the water by exchanging heat with combustion gas. The water heated in the medium-pressure economizer 143 is supplied to the medium-pressure drum 148. The medium-pressure evaporator 144 may be connected to the medium-pressure drum 148, so that the water stored in the medium-pressure drum 148 is converted into steam by exchanging heat with combustion gas and the steam is then supplied to the medium-pressure superheater (not shown) after steam-water separation is performed in the medium-pressure drum 148.

The high-pressure section H3 includes a high-pressure economizer 145, a high-pressure evaporator 146, a high-pressure drum 149, and a high-pressure superheater 178. The water in the deaerator 175 is supplied to the high-pressure economizer 145 by a high-pressure pump 173. The high-pressure economizer 145 heats the water by exchanging heat with combustion gas. The water heated in the high-pressure economizer 145 is supplied to the high-pressure drum 149. The high-pressure evaporator 146 may be connected to the high-pressure drum 149, so that the water stored in the high-pressure drum 149 is converted into steam by exchanging heat with combustion gas and the steam is then supplied to the high-pressure superheater 178 after steam-water separation in the high-pressure drum 149.

The steam stored in the low-pressure drum 147, the medium-pressure drum 148, and the high-pressure drum 149 may be supplied to low-pressure, medium-pressure, and high-pressure steam turbines, respectively. During such supply, the steam stored in the low-pressure drum 147, the steam stored in the medium-pressure drum 148, and the steam stored in the high-pressure drum 149 may be supplied through the low-pressure superheater (not shown), the medium-pressure superheater (not shown), and the high-pressure superheater 178, respectively.

Figure 3:
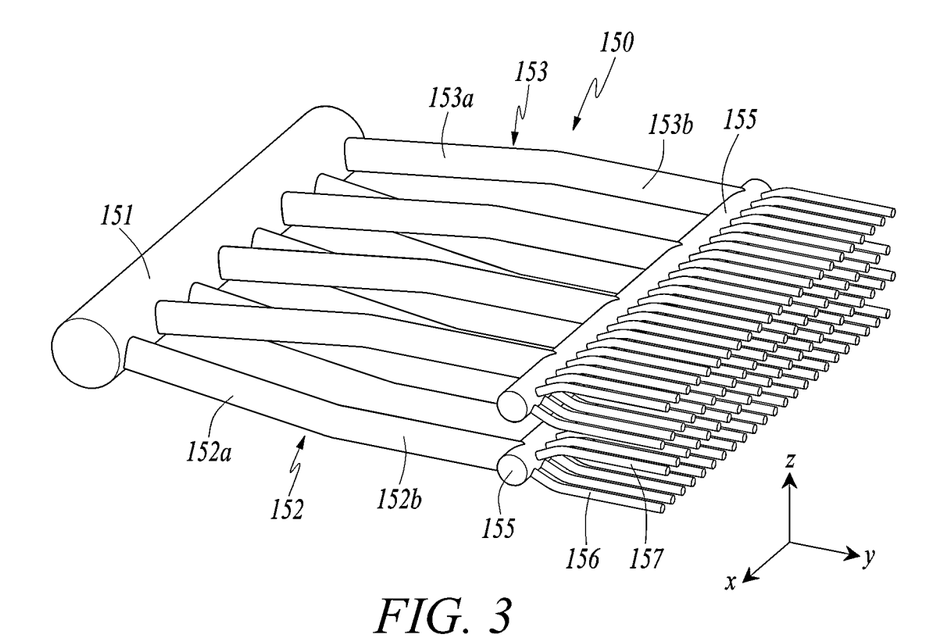
FIG. 3 is a perspective view illustrating a heat exchanger according to the first exemplary embodiment.
Figure 4:
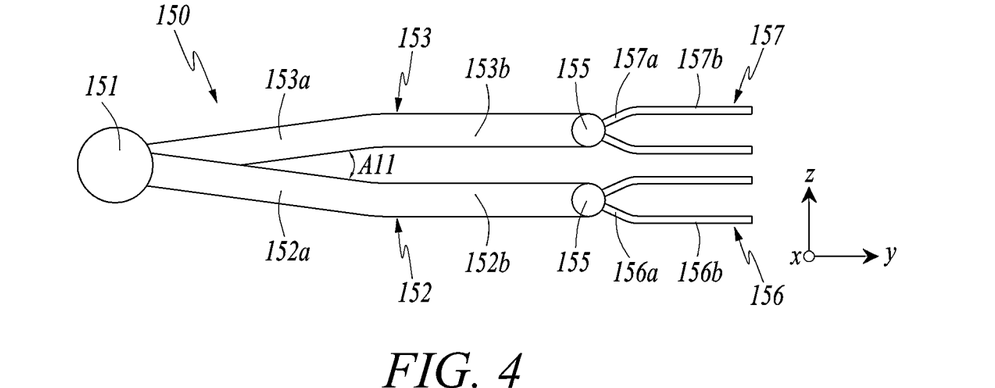
FIG. 4 is a side view illustrating the heat exchanger according to the first exemplary embodiment.

FIG. 3 is a perspective view illustrating a heat exchanger according to the first exemplary embodiment. FIG. 4 is a side view illustrating the heat exchanger according to the first exemplary embodiment.

Throughout the specification, the direction of the side view is the direction parallel to the longitudinal direction of the manifold 151, which will be described later. This longitudinal direction will be referred to as a first longitudinal direction or a direction x. Throughout the specification, a direction from the manifold 151 toward the tubes 156, 157, which will be described later, and perpendicular to the first longitudinal direction x will be referred to as a second longitudinal direction or a direction y. Also, a direction perpendicular to the direction x and direction y will be referred to as a height direction or a direction z.

Referring to FIGS. 3 and 4, the heat exchanger, which is designated by reference numeral 150, according to the present embodiment may be a once-through heat exchanger, and in particular, a vertical once-through heat exchanger applied to the heat recovery steam generator 140. Alternatively, the heat exchanger 150 may be the high-pressure superheater 178 of the high-pressure section H3.

The heat exchanger 150 may include a plurality of tubes 156 and 157, a plurality of heads 155, a first link pipe 152, a second link pipe 153, and a manifold 151. The heat exchanger 150 includes the tubes 156 and 157, and steam flowing along the tubes 156 and 157 may be heated by high-temperature combustion gas.

Each of the first tube 156 and the second tube 157 may be coupled to one of the heads 155. While the first tube 156 and second tube 157 are formed to protrude from the head 155 generally in the second longitudinal direction y, the first tube 156 may protrude downward in the height direction z from the head 155, and the second tube 157 may protrude upward in the height direction z from the head 155. Specifically, the first tube 156 may include a first inclined connection part 156a protruding downward in the height direction z from the head 155 obliquely with respect to the second longitudinal direction y and a first extension part 156b extending and bent from the first inclined connection part 156a and extending in parallel to the second longitudinal direction y. The second tube 157 may include a second inclined connection part 157a protruding upward from the head 155 obliquely with respect to the second longitudinal direction y and a second extension part 157b extending and bent from the second inclined connection part 157a and extending in parallel to the second longitudinal direction y.

Each head 155 is connected to the plurality of tubes 156 and 157 and accommodates steam delivered from the tubes 156 and 157. The head 155 may be a pipe that extends parallel to the manifold 151 in the first longitudinal direction x and has both longitudinal ends blocked.

The plurality of heads 155 may be arranged parallel to each other and may be spaced apart at the same distance from the manifold 151 in the second longitudinal direction y. In addition, the heads 155 may be spaced in the height direction z of the once-through heat exchanger.

The first link pipe 152 may include a first inclined link part 152a and a first connection link part 152b. The first connection link part 152b extends from an associated one of the heads 155 toward the manifold 151 in parallel to the second longitudinal direction y. The first inclined link part 152a extending obliquely from the first connection link part 152b with respect to the second longitudinal direction y and the height direction z and coupled to the manifold 151. The first link pipe 152 may have a larger outer diameter than the tubes 156 and 157, and the first link pipe 152 may have a larger thickness than the tubes 156 and 157.

The second link pipe 153 may include a second inclined link part 153a and a second connection link part 153b. The second connection link part 153b extends from an associated one of the heads toward the manifold 151 in parallel to the second longitudinal direction y. The second inclined link part 153a extends obliquely from the second connection link part 153b with respect to the second longitudinal direction y and the height direction z and coupled to the manifold 151. The second link pipe 153 may have a larger outer diameter than the tubes 156 and 157, and the second link pipe 153 may have a larger thickness than the tubes 156 and 157. The first inclined part 152a and a second inclined part 153a are inclined toward opposite directions based on the height direction z.

The first connection link part 152b and the second connection link part 153b may be arranged parallel to and spaced apart from each other. The first inclined link part 152a may be inclined at a preset angle of inclination A11 with respect to the second inclined link part 153a. The first inclined link part 152a may extend from the manifold 151 downward in the height direction z and obliquely with respect to the second longitudinal direction y and the second inclined link part 153a may extend from the manifold 151 upward in the height direction z and obliquely with respect to the second longitudinal direction y.

Figure 5:
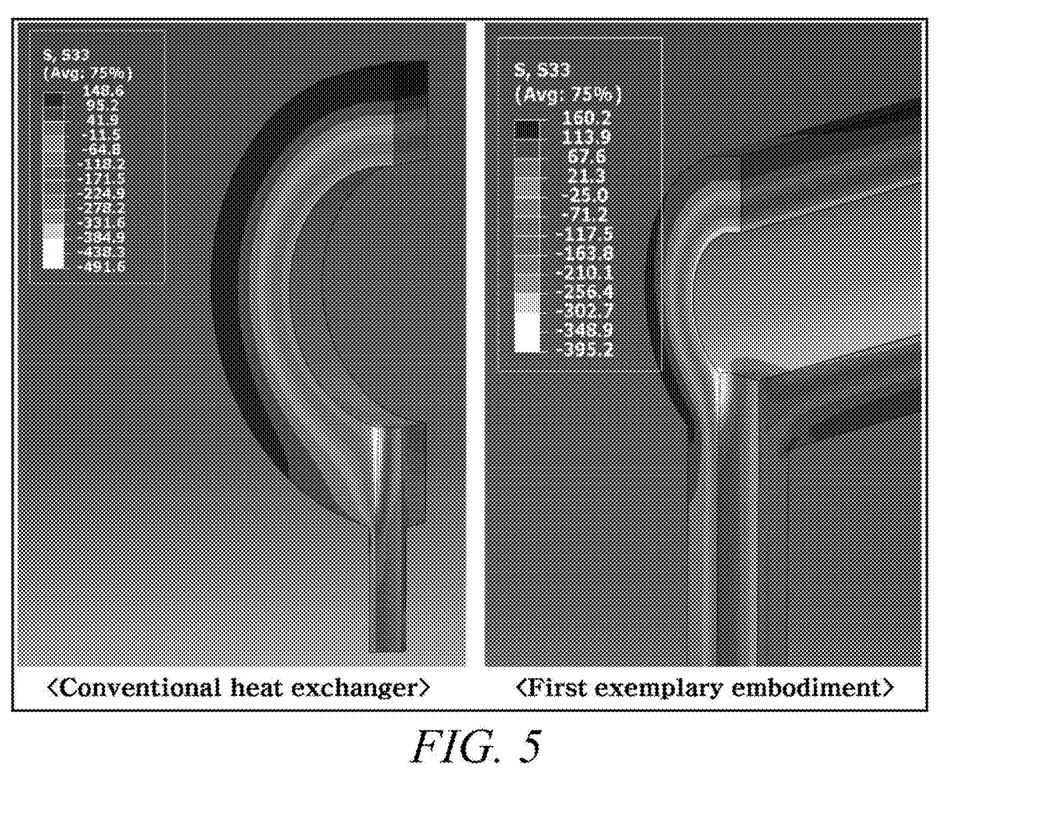
FIG. 5 is a graph illustrating a comparison of thermal stress distribution between the heat exchanger according to the first exemplary embodiment and a conventional heat exchanger.

FIG. 5 is a graph illustrating a comparison of thermal stress distribution between the heat exchanger according to the first exemplary embodiment and a conventional heat exchanger.

The conventional heat exchanger has a structure in which tubes are directly connected to a manifold. As illustrated in FIG. 5, it can be seen in the conventional heat exchanger that a large thermal stress occurs in a portion where the manifold is connected to the tubes and the thermal stress is large even in a portion adjacent to the outer surface of that portion. However, in the heat exchanger 150 according to the present embodiment, a large thermal stress occurs in a portion where the manifold 151 is connected to the first link pipe 152, but it occurs only in a local portion of the inner side thereof. In addition, the thermal stress is large in a portion only less than half of the thickness of that portion, and the thermal stress is greatly reduced on the outer surface of that portion, according to the present embodiment.

In particular, since the first inclined connection part 156a and the second inclined connection part 157a are inclined in opposite directions based on the height direction z, the steam can be introduced through the first and second inclined connection parts in a direction crossing each other into the manifold 151. Also, the steam can be introduced into the manifold 151 from tubes located in different positions in the height direction z. Thereby, the steam can be uniformly mixed within the manifold 151. In addition, it is possible to prevent the concentration of heat in a portion of the heat exchanger.

As described above, the heat exchanger 150 according to the present embodiment can significantly reduce piping breakage due to thermal stress.

Hereinafter, a heat exchanger according to a second exemplary embodiment will be described.

Figure 6:
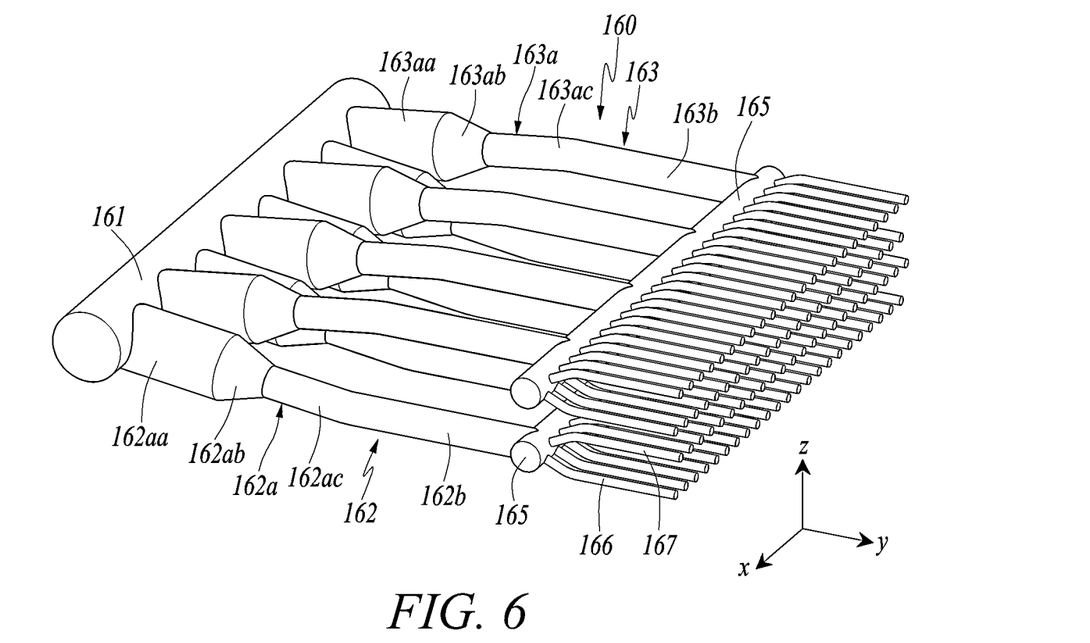
FIG. 6 is a perspective view illustrating a heat exchanger according to a second exemplary embodiment.
Figure 7:
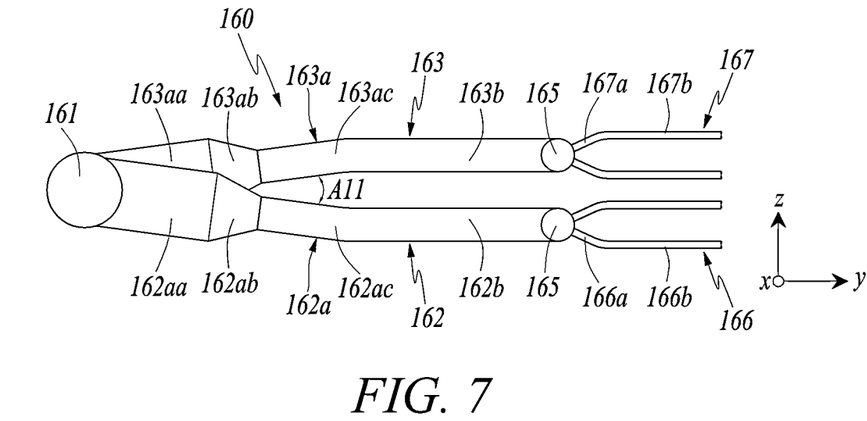
FIG. 7 is a side view illustrating the heat exchanger according to the second exemplary embodiment.

FIG. 6 is a perspective view illustrating the heat exchanger according to the second exemplary embodiment. FIG. 7 is a side view illustrating the heat exchanger according to the second exemplary embodiment.

Referring to FIGS. 6 and 7, the heat exchanger, which is designated by reference numeral 160, according to the second exemplary embodiment may include a plurality of tubes 166 and 167, a plurality of heads 165, a first link pipe 162, a second link pipe 163, and a manifold 161.

Since the heat exchanger 160 according to the second exemplary embodiment has the same structure as the heat exchanger according to the first exemplary embodiment, with the sole exception of the first link pipe 162 and the second link pipe 163, a redundant description thereof will be omitted.

Each of the first tube 166 and the second tube 167 may be coupled to one of the heads 165. While the first tube 166 and second tube 167 are formed to protrude from the head 155 generally in the second longitudinal direction y, the first tube 166 may protrude downward in the height direction z from the head 165, and the second tube 167 may protrude upward in the height direction z from the head 165.

Specifically, the first tube 166 may include a first inclined connection part 166a protruding downward in the height direction z from the head 165 obliquely with respect to the second longitudinal direction y and a first extension part 166b extending and bent from the first inclined connection part 166a and extending in parallel to the second longitudinal direction y. The second tube 167 may include a second inclined connection part 167a protruding upward from the head 165 obliquely with respect to the second longitudinal direction y and a second extension part 167b extending and bent from the second inclined connection part 167a and extending in parallel to the second longitudinal direction y.

The first link pipe 162 may include a first inclined link part 162a and a first connection link part 162b. The first connection link part 162b extends from an associated one of the heads 165 toward the manifold 161 in parallel to the second longitudinal direction y. The first inclined link part 162a extending obliquely from the first connection link part 162b with respect to the second longitudinal direction y and the height direction z and coupled to the manifold 161.

In addition, the first inclined link part 162a may include a large diameter portion 162aa having a larger outer diameter than the first connection link part 162b, a small diameter portion 162ac having the same inner diameter as the first connection link part 162b, and a diameter varying portion 162ab connecting the large diameter portion 162aa and the small diameter portion 162ac. The large diameter portion 162aa may be connected to the manifold 161. The diameter varying portion 162ab may be formed such that the inner and outer diameters thereof gradually decrease from the large diameter portion 162aa to the small diameter portion 162ac.

The second link pipe 163 may include a second inclined link part 163a and a second connection link part 163b. The second connection link part 163b extends from an associated one of the heads 165 toward the manifold 161 in parallel to the second longitudinal direction y. The second inclined link part 163a extends obliquely from the second connection link part 163b with respect to the second longitudinal direction y and the height direction z and coupled to the manifold 161. The second link pipe 163 may have a larger outer diameter than the tubes 166 and 167, and the second link pipe 163 may have a larger thickness than the tubes 166 and 167.

The first connection link part 162b and the second connection link part 163b may be arranged parallel to and spaced apart from each other. The first inclined link part 162a may be inclined at a preset angle of inclination A11 with respect to the second inclined link part 163a. The first inclined link part 162a may extend from the manifold 161 downward in the height direction z and obliquely with respect to the second longitudinal direction y and the second inclined link part 163a may extend from the manifold 161 upward in the height direction z and obliquely with respect to the second longitudinal direction y.

In addition, the second inclined link part 163a may include a large diameter portion 163aa having a larger outer diameter than the second connection link part 163b, a small diameter portion 163ac having the same inner diameter as the second connection link part 163b, and a diameter varying portion 163ab connecting the large diameter portion 163aa and the small diameter portion 163ac. The large diameter portion 163aa may be connected to the manifold 161. The diameter varying portion 163ab may be formed such that the inner and outer diameters thereof gradually decreases from the large diameter portion 163aa to the small diameter portion 163ac.

Figure 8:
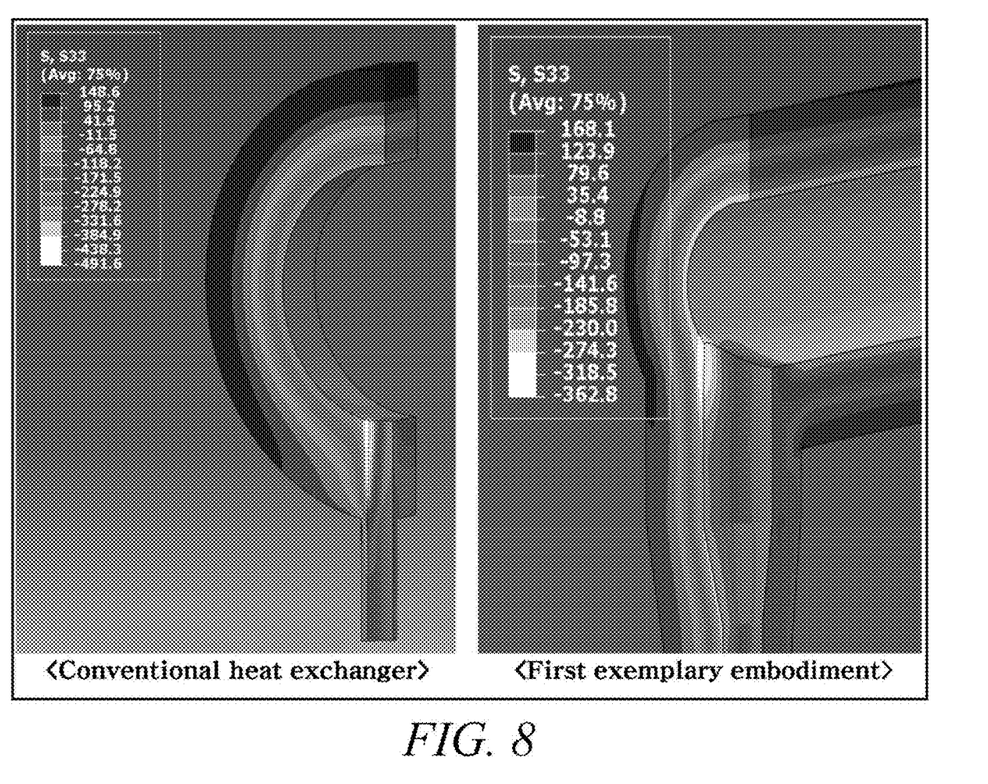
FIG. 8 is a graph illustrating a comparison of thermal stress distribution between the heat exchanger according to the second exemplary embodiment and a conventional heat exchanger.

FIG. 8 is a graph illustrating a comparison of thermal stress distribution between the heat exchanger according to the second exemplary embodiment and a conventional heat exchanger.

The conventional heat exchanger has a structure in which tubes are directly connected to a manifold. As illustrated in FIG. 8, it can be seen in the conventional heat exchanger that a large thermal stress occurs in a portion where the manifold is connected to the tubes and the thermal stress is large even in a portion adjacent to the outer surface of that portion. However, in the heat exchanger 160 according to the present embodiment, a large thermal stress occurs in a portion where the first link pipe 162 is connected to the manifold 161, but it occurs only in a local portion of the inner side thereof. In addition, only a relatively small thermal stress occurs in most of the connection portions, according to the present embodiment.

In particular, since the first inclined link part 162a and the second inclined link part 163a include the diameter varying portion 162ab and the diameter varying portion 163ab, respectively, the pressure and speed of steam can be reduced in the diameter varying portion 162ab and the diameter varying portion 163ab. Therefore, it is possible to significantly reduce thermal stress and thermal damage compared to the prior art.

As is apparent from the above description, the once-through heat exchanger according to the exemplary embodiments can prevent breakage due to thermal stress since the first link pipe and the second link pipe include the first inclined link part and the second inclined link part, respectively, extending at an angle to each other. In addition, since the first link pipe and the second link pipe include the respective diameter varying portion, it is possible to further prevent breakage due to thermal stress.

While one or more exemplary embodiments have been described with reference to the accompanying drawings, it will be apparent to those skilled in the art that various variations and modifications may be made by adding, changing, or removing components without departing from the spirit and scope of the disclosure as defined in the appended claims, and these variations and modifications fall within the spirit and scope of the disclosure as defined in the appended claims. Also, it is noted that any one feature of an embodiment of the present disclosure described in the specification may be applied to another embodiment of the present disclosure.

What is claimed is:

1. A once-through heat exchanger comprising:
   a tube stack comprising a plurality of tubes;
   a plurality of heads connected to the tubes and configured to accommodate heated steam; and
   a manifold connected to the heads via a first link pipe and a second link pipe and configured to accommodate heated steam; and
   wherein the first link pipe comprises a first connection link part extending from an associated one of the heads toward the manifold and a first inclined link part extending and protruding obliquely from the first connection link part and coupled with the manifold,
   wherein the first inclined link part comprises three concentrically arranged portions, which are a first large diameter portion connected to the manifold and having a larger outer diameter than the first connection link part, a first diameter varying portion connected to the first large diameter portion and whose inner diameter gradually decreases, and a first small diameter portion connecting the first diameter varying portion to the first connection link part and having the same inner diameter as the first connection link part.

2. The once-through heat exchanger according to claim 1, wherein:

the heads are spaced in a direction perpendicular to a longitudinal direction thereof; and the second link pipe comprises a second inclined link part extending from the manifold at an angle with the first inclined link part.

3. The once-through heat exchanger according to claim 2, wherein the heads are arranged parallel to each other and positioned at the same distance from the manifold.

4. The once-through heat exchanger according to claim 3, wherein the heads are spaced in a height direction of the once-through heat exchanger.

5. The once-through heat exchanger according to claim 2, wherein the second link pipe comprises a second connection link part extending from an associated one of the heads toward the manifold and the second inclined link part extending and protruding obliquely from the second connection link part and coupled to the manifold.

6. The once-through heat exchanger according to claim 5, wherein the first connection link part and the second connection link part are arranged parallel to each other, the first inclined link part extends obliquely downward from the manifold, and the second inclined link part extends obliquely upward from the manifold.

7. The once-through heat exchanger according to claim 5, wherein the second inclined link part comprises three concentrically arranged portions, which are a second large diameter portion connected to the manifold and having a larger outer diameter than the second connection link part, a second diameter varying portion connected to the second large diameter portion and whose inner diameter gradually decreases, and a second small diameter portion connecting the second diameter varying portion to the second connection link part and having the same inner diameter as the second connection link part.

8. The once-through heat exchanger according to claim 7, wherein the first diameter varying portion and the second diameter varying portion are located relatively closer to the manifold than to the plurality of heads.

9. The once-through heat exchanger according to claim 8, wherein an outer diameter of the first small diameter portion and an outer diameter of the second small diameter portion and an outer diameter of the plurality of heads are the same.

10. The once-through heat exchanger according to claim 9, wherein the plurality of tubes comprises a first tube and a second tube,
the first tube includes a first inclined connection part protruding downward obliquely from the associated one of the heads and a first extension part extending and bent from the first inclined connection part, extending in parallel to the first connection link part, and
the second tube includes a second inclined connection part protruding upward obliquely from the associated one of the heads and a second extension part extending and bent from the second inclined connection part, extending in parallel to the second connection link part.

11. A combined power generation system comprising:
a gas turbine configured to generate rotational force by combusting fuel and discharge a combustion gas;
a heat recovery steam generator configured to generate and heat steam using the combustion gas discharged from the gas turbine; and
a steam turbine using the steam heated by the heat recovery steam generator,
wherein the heat recovery steam generator comprises a plurality of heat exchangers,
wherein each of the heat exchangers comprises:
a tube stack comprising a plurality of tubes;
a plurality of heads connected to the tubes and configured to accommodate heated steam; and
a manifold connected to the heads via a first link pipe and a second link pipe and configured to accommodate heated steam; and
wherein the first link pipe comprises a first connection link part extending from an associated one of the heads toward the manifold and a first inclined link part extending and protruding obliquely from the first connection link part and coupled with the manifold,
wherein the first inclined link part comprises three concentrically arranged portions, which are a first large diameter portion connected to the manifold and having a larger outer diameter than the first connection link par, a first diameter varying portion connected to the first large diameter portion and whose inner diameter gradually decrease, and a first small diameter portion connecting the first diameter varying portion to the first connection link part and having the same inner diameter as the first connection link part.

12. The combined power generation system according to claim 11, wherein:
the heads are spaced in a direction perpendicular to a longitudinal direction thereof; and
the second link pipe comprises a second inclined link part extending from the manifold at an angle with the first inclined link part.

13. The combined power generation system according to claim 12, wherein the heads are arranged parallel to each other and positioned at the same distance from the manifold.

14. The combined power generation system according to claim 13, wherein the heads are spaced in a height direction of the heat exchanger.

15. The combined power generation system according to claim 12, wherein the second link pipe comprises a second connection link part extending from an associated one of the heads toward the manifold and the second inclined link part extending and protruding obliquely from the second connection link part and coupled to the manifold.

16. The combined power generation system according to claim 15, wherein the first connection link part and the second connection link part are arranged parallel to each other, the first inclined link part extends obliquely downward from the manifold, and the second inclined link part extends obliquely upward from the manifold.

17. The combined power generation system according to claim 15, wherein the second inclined link part comprises three concentrically arranged portions, which are a second large diameter portion connected to the manifold and having a larger outer diameter than the second connection link part, a second diameter varying portion connected to the second large diameter portion and whose inner diameter gradually decreases, and a second small diameter portion connecting the second diameter varying portion to the second connection link part and having the same inner diameter as the second connection link part.

* * * * *